US012143794B2

(12) United States Patent
Wen et al.

(10) Patent No.: US 12,143,794 B2
(45) Date of Patent: Nov. 12, 2024

(54) LOUDSPEAKER USING SEMICONDUCTOR VOICE COIL AND ELECTRONIC DEVICE USING THE SAME

(71) Applicant: Transound Electronics Co., Ltd., Dongguan (CN)

(72) Inventors: Tseng-Feng Wen, Dongguan (CN); Hui Xue, Dongguan (CN)

(73) Assignee: Transound Electronics Co., Ltd., Dongguan (CN)

( * ) Notice: Subject to any disclaimer, the term of this patent is extended or adjusted under 35 U.S.C. 154(b) by 188 days.

(21) Appl. No.: 17/945,385

(22) Filed: Sep. 15, 2022

(65) Prior Publication Data

US 2024/0048912 A1 Feb. 8, 2024

(30) Foreign Application Priority Data

Aug. 3, 2022 (CN) ......................... 202210929435.9

(51) Int. Cl.
*H04R 9/02* (2006.01)
*H04R 9/04* (2006.01)
*H04R 9/06* (2006.01)

(52) U.S. Cl.
CPC ............. *H04R 9/027* (2013.01); *H04R 9/046* (2013.01); *H04R 9/06* (2013.01)

(58) Field of Classification Search
CPC .......... H04R 9/027; H04R 9/046; H04R 9/06; H04R 1/02; H04R 9/025; H04R 1/025; H04R 1/023; H04R 1/36; H04R 1/345; H04R 2499/11; H04R 1/2811; H04R 1/021; H04R 9/10; H04R 7/04; H04R 1/288; H04R 9/02; H04R 1/24; H04R 9/063; H04R 7/16; H04R 2400/11
USPC ................. 381/398, 401–415, 419, 420–421
See application file for complete search history.

(56) References Cited

U.S. PATENT DOCUMENTS

2014/0169593 A1* 6/2014 Kwon .................... H04R 9/043 381/185
2015/0373457 A1* 12/2015 Asano .................... H04R 9/025 381/412
2020/0045451 A1* 2/2020 Zhang ...................... H04R 9/06
2020/0100039 A1* 3/2020 Reining ............... H04R 29/001
2020/0120426 A1* 4/2020 Heilemann .......... H04R 1/2803

* cited by examiner

*Primary Examiner* — Carolyn R Edwards
*Assistant Examiner* — Julie X Dang
(74) *Attorney, Agent, or Firm* — ScienBiziP, P.C.

(57) ABSTRACT

A loudspeaker using a semiconductor voice coil includes a vibrating assembly and a magnetic force assembly. The magnetic force assembly and the vibrating assembly are arranged at an interval. The vibrating component includes a diaphragm and the semiconductor voice coil. The semiconductor voice coil is arranged on a side of the diaphragm. The magnetic force assembly and the semiconductor voice coil are arranged on the same side of the diaphragm. A magnetic gap is defined in the magnetic force assembly. The semiconductor voice coil is arranged in the magnetic gap. The magnetic field lines in the magnetic gap are perpendicular to the direction of current in the semiconductor voice coil. An electronic device including the loudspeaker is also disclosed.

14 Claims, 7 Drawing Sheets

LOUDSPEAKER USING SEMICONDUCTOR VOICE COIL AND ELECTRONIC DEVICE USING THE SAME

FIELD

The subject matter relates to the sound technology field, and in particular, to loudspeaker and electronic device using the same.

BACKGROUND

Loudspeaker is an electro-sound element that converts electrical signals into audible sounds. Electronic products are widely used in society, and electronic products have diversified functions. In order to adapt to the increasingly sophisticated and changing trends of electronic equipment, it is necessary to give additional functions and capabilities to the loudspeaker so that the loudspeaker can be adapted to various installation requirements.

SUMMARY

A loudspeaker using a semiconductor voice coil includes a vibrating assembly and a magnetic force assembly. The magnetic force assembly and the vibrating assembly are arranged at an interval. The vibrating component includes a diaphragm and the semiconductor voice coil. The semiconductor voice coil is arranged on a side of the diaphragm. The magnetic force assembly and the semiconductor voice coil are arranged on the same side of the diaphragm. A magnetic gap is defined in the magnetic force assembly. The semiconductor voice coil is arranged in the magnetic gap. The magnetic field lines in the magnetic gap are perpendicular to the direction of current in the semiconductor voice coil. An electronic device including the loudspeaker is also disclosed.

DETAILED DESCRIPTION

Figure 1:
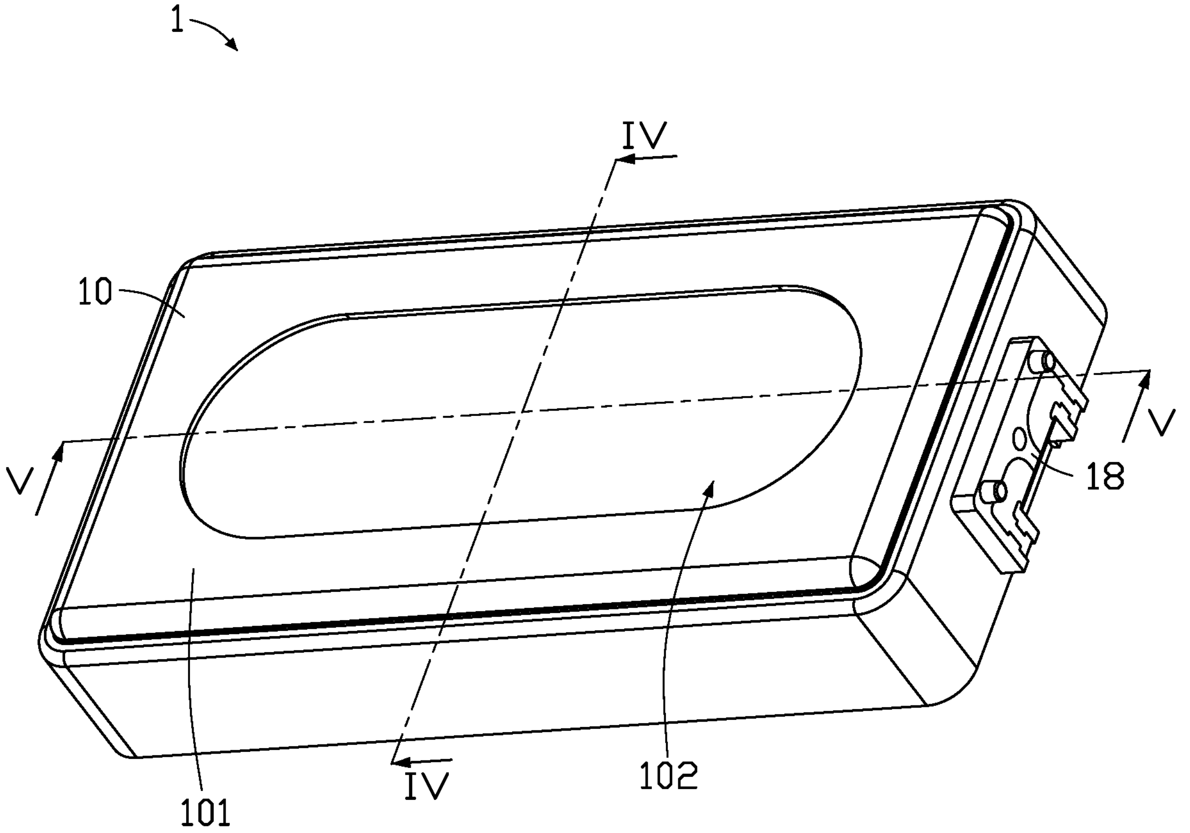
FIG. 1 is a schematic view of a loudspeaker.
Figure 2:
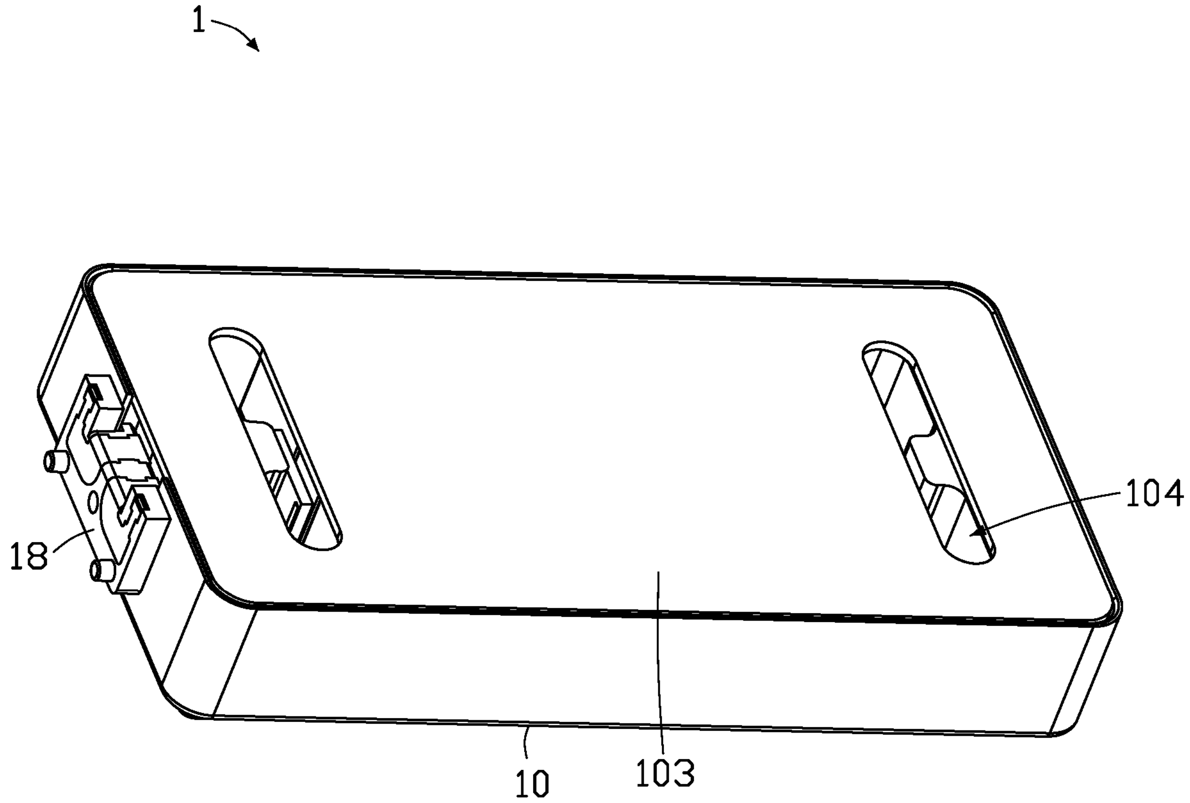
FIG. 2 is a schematic view of the loudspeaker.
Figure 3:
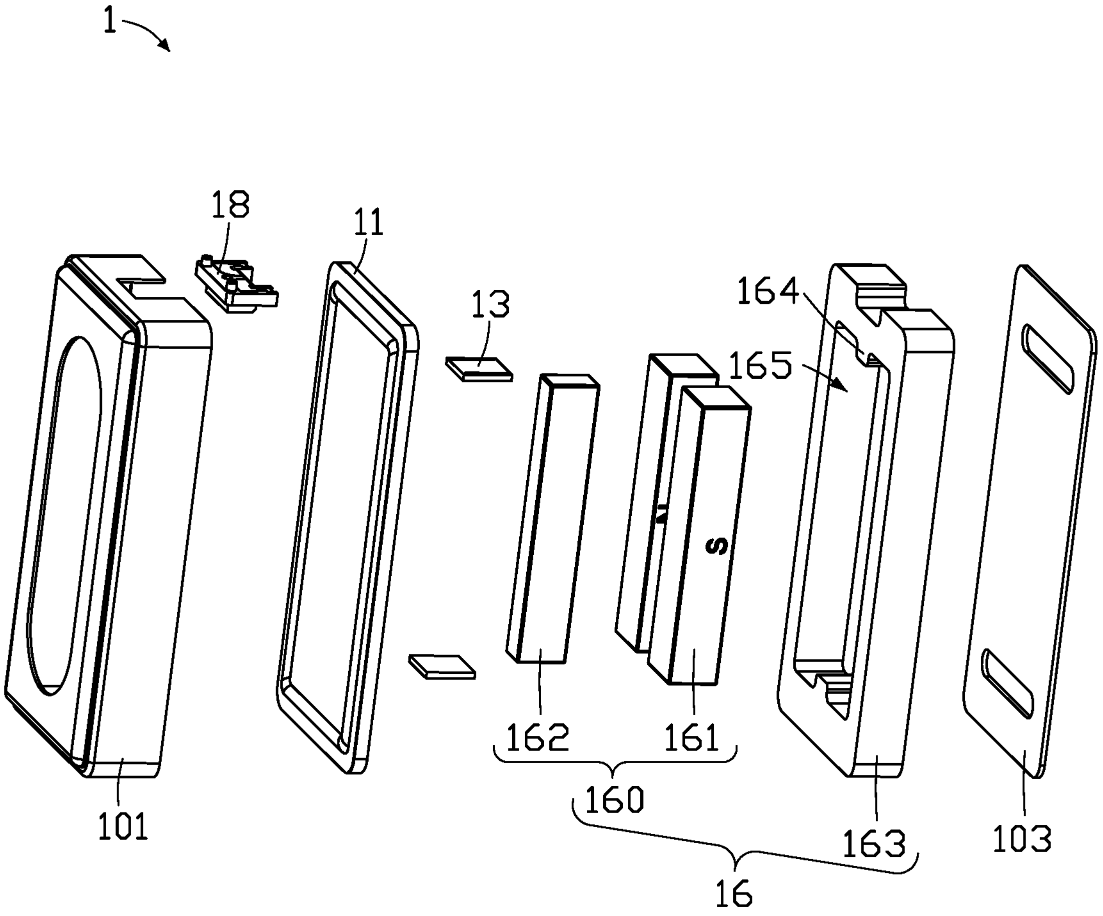
FIG. 3 is a schematic exploded perspective view of the loudspeaker.
Figure 4:
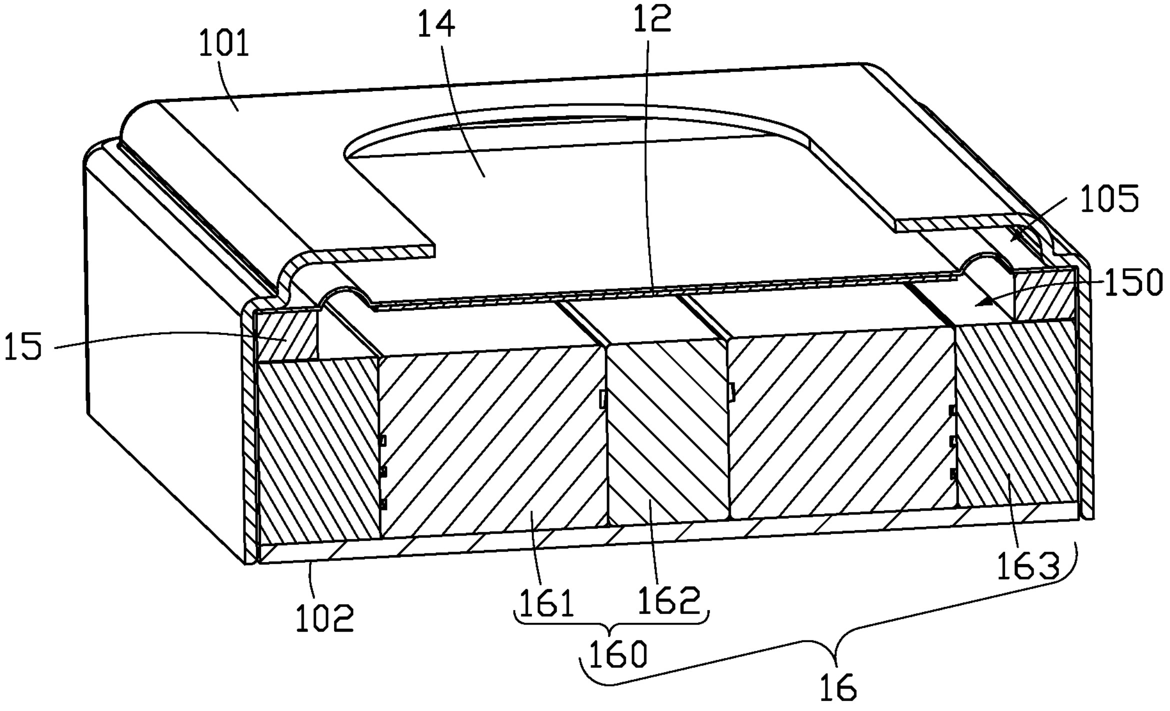
FIG. 4 is a schematic cross-sectional view along a line IV-IV of FIG. 1.
Figure 5:
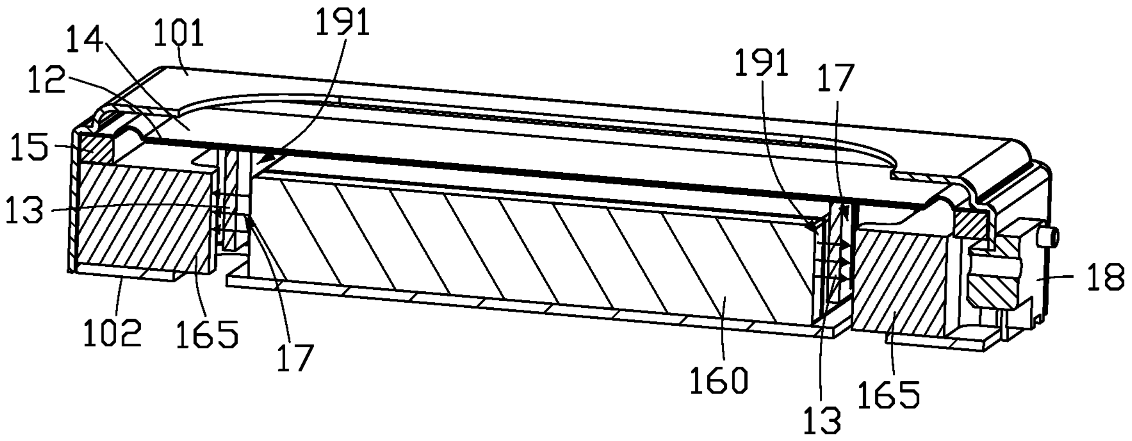
FIG. 5 is a schematic cross-sectional view along a line V-V of FIG. 1.
Figure 6:
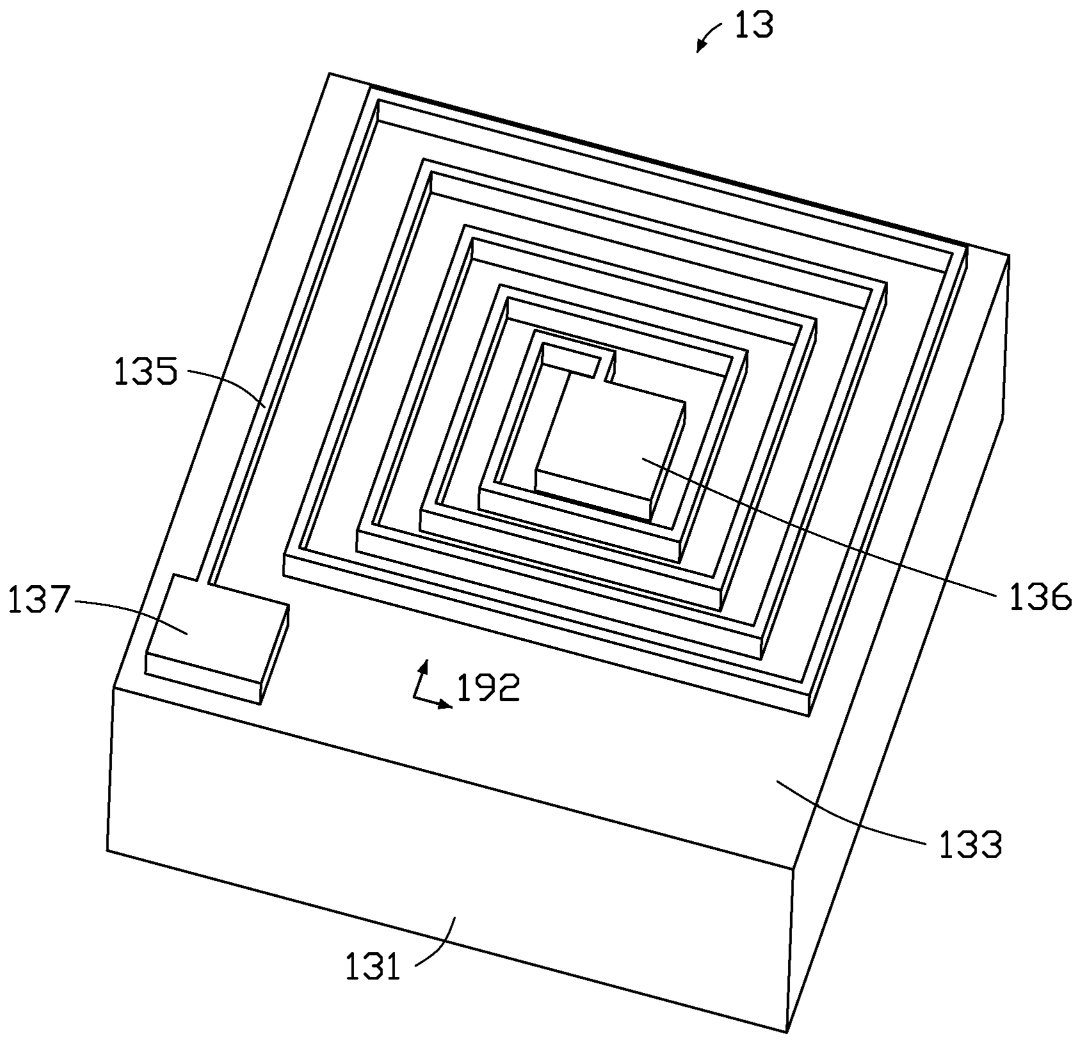
FIG. 6 is a schematic structural view of a semiconductor voice coil of the loudspeaker of FIG. 1.

The following descriptions refer to the attached drawings for a more comprehensive description of this application. Sample embodiments of this application are shown in the attached drawings. However, this application can be implemented in many different forms and should not be construed as limited to exemplary embodiments set forth herein. These exemplary embodiments are provided to make this application thorough and complete, and to adequately communicate the scope of this application to those skilled in the field. Similar diagram labels represent the same or similar components.

The terms used herein are intended only to describe the purpose of particular exemplary embodiments and are not intended to limit this application. As used herein, the singular forms “one”, “one” and “the” are intended to include the plural as well, unless the context otherwise clearly indicates it. In addition, the words “include” and/or “include” and/or “have”, integers, steps, operations, components and/or components, do not exclude additional or pluralities of features, regions, integers, steps, operations, components, components, and/or groups thereof.

Unless otherwise defined, all terms used herein (including technical and scientific terms) have the same meaning as would normally be understood by ordinary technicians in the field of this application. In addition, unless expressly defined in the context, terms such as those defined in a general dictionary shall be construed to have meanings consistent with those in the relevant technology and in the content of this application, and shall not be construed to have idealistic or overly formal meanings.

Examples of embodiments are described below in combination with the attached drawings. It should be noted that the components depicted in the attached drawings may be shown not to scale; the same or similar components will be assigned the same or similar drawing mark representation or similar technical terms.

The following is a detailed description of the specific implementation of this application, referring to the attached drawings.

As shown in FIG. 1 to FIG. 6, a loudspeaker 1 includes a housing 10, a vibrating assembly 11, and a magnetic force assembly 16.

The magnetic force assembly 16 is spaced apart from the vibrating assembly 11. The magnetic force assembly 16 cooperates with the vibrating assembly 11 to make the vibrating assembly 11 vibrate to emit sound. The vibrating assembly 11 includes a diaphragm 12 and a semiconductor voice coil 13, and the semiconductor voice coil 13 is disposed on one side of the diaphragm 12. The magnetic force assembly 16 and the semiconductor voice coil 13 are arranged on the same side of the diaphragm 12. A magnetic gap 17 is formed in the magnetic assembly 16. The magnetic gap 17 is used to allow the semiconductor voice coil 13 to be arranged in the magnetic gap 17. The magnetic field lines 191 in the magnetic gap 17 are perpendicular to the current direction 192 in the semiconductor voice coil 13.

In one embodiment, two semiconductor voice coils 13 are disposed on the same side of the diaphragm 12 at intervals. Two spaced magnetic gaps 17 are formed in the magnetic assembly 16.

Compared with the prior art, the two semiconductor voice coils 13 of the loudspeaker 1 are connected to the same side of the diaphragm 12 at intervals. Each semiconductor voice coil 13 is arranged in a magnetic gap 17. The magnetic field lines 191 in the magnetic gap 17 are perpendicular to the current direction 192 in the semiconductor voice coil 13. The semiconductor voice coil 13 can vibrate up and down along the axis with the change of the current, thereby driving the diaphragm 12 connected to the semiconductor voice coil 13 to vibrate up and down to produce sound. The spacing of the two semiconductor voice coils 13 can maximize the utilization of the magnetic circuit, and maintain or improve the balance when the diaphragm 12 vibrates up and down, thereby reducing the distortion of the loudspeaker 1 and improving the sensitivity of the loudspeaker 1.

In one embodiment, the housing 10 includes an upper cover 101 and a lower cover 103. The upper cover 101 may be in a semi-enclosed shape. The lower cover 103 may be plate-shaped. The upper cover 101 is secured to the lower cover 103 to form a receiving portion 105. The vibrating assembly 11 and the magnetic force assembly 16 are arranged in the receiving portion 105.

In one embodiment, the upper cover 101 defines a first sound hole 102. The first sound hole 102 communicates with the receiving portion 105. The lower cover 103 is provided with a second sound hole 104 therethrough. The second sound hole 104 communicates with the receiving portion 105. The first sound hole 102 and the second sound hole 104 are used to communicate the conductive medium (egg air) inside and outside the accommodating portion 105 to realize output of sound.

In the present embodiment, the housing 10 may be approximately a hexagonal structure. Further, the upper cover 101 may be in the shape of a semi-enclosed shell having five faces in a rectangular parallelepiped. The first sound hole 102 opens on the surface of the upper cover 101 with the largest area. The first sound hole 102 may be elliptical. The area of the oval-shaped first sound hole 102 occupies at least 50% of the area of the surface on which the first sound hole 102 is opened. The lower cover 103 may be in the shape of a rectangular plate. The lower cover 103 is matched with the upper cover 101, and the lower cover 103 can cover the opening of the upper cover 101. The lower cover 103 may be provided with two spaced second sound holes 104. The two second sound holes 104 are disposed to correspond with the semiconductor voice coil 13.

In one embodiment, the semiconductor voice coil 13 includes a first end surface 131 and a first surface 133. The first surface 133 is connected to the first end surface 131. The first surface 133 is provided with an induction circuit 135.

In one embodiment, the semiconductor voice coil 13 is a sheet of materials. The first surface 133 is a surface with a larger area among the surfaces of the semiconductor voice coil 13. Spaced first electrodes 136 and second electrodes 137 are formed on the first surface 133. The first electrode 136 and the second electrode 137 are electrically connected through the induction circuit 135. The sensing circuit 135 may be a ring-shaped circuit extending around the first electrode 136 to the second electrode 137.

In one embodiment, the semiconductor voice coil 13 may be a voice coil structure with a high degree of integration formed by photolithography and etching. The first electrode 136, the second electrode 137 and the induction circuit 135 on the semiconductor voice coil 13 can be obtained by developing and etching after plating a conductive layer on the substrate.

Compared with the traditional coiled voice coil, the semiconductor voice coil 13 of the present application has the advantages of smaller volume, lighter weight, higher line density, etc. The semiconductor voice coil 13 can be designed for a more complex circuit structure according to actual needs. The loudspeaker 1 can be more easily miniaturized.

In one embodiment, the first end surface 131 is connected to the diaphragm 12.

In this embodiment, the first end surface 131 is the surface of the semiconductor voice coil 13 with a smaller area. The semiconductor voice coil 13 is vertically connected and fixed to the diaphragm 12. Specifically, the first end surface 131 is adhered to the surface of the diaphragm 12, and the first surface 133 is perpendicular to the diaphragm 12.

Further, the semiconductor voice coil 13 is connected and fixed to the diaphragm 12, so that the semiconductor voice coil 13 and the diaphragm 12 move synchronously. This structure enables the first surface 133 and the induction circuit 135 disposed on the first surface to be perpendicular to the magnetic field lines 191 in the magnetic gap 17, and the semiconductor voice coil 13 cutting the magnetic field lines 191 means that the diaphragm 12 is driven to vibrate.

In one embodiment, two semiconductor voice coils 13 are arranged in series.

In this embodiment, the two semiconductor voice coils 13 may be connected by conductive wires (not shown). The conductive wires can be fixed on the surface of the diaphragm 12. The two semiconductor voice coils 13 connected in series can be connected or disconnected synchronously, and the current-feeds of the two semiconductor voice coils 13 can be electromagnetically reacted with the magnetic field lines 191 in the magnetic gap 17 at the same time, so that the two semiconductor voice coils 13 drive the diaphragm 12 to vibrate. The two spaced semiconductor voice coils 13 can be used to drive the diaphragm 12 to vibrate at the same time.

In one embodiment, the vibration assembly 11 further includes a composite film 14, and the composite film 14 is connected to the vibration membrane 12. The composite film 14 is used to protect the diaphragm 12 or to provide other functional gains.

In one embodiment, the vibration assembly 11 further includes a spacer 15. The spacer 15 is connected to the composite film 14. The spacer 15 and the diaphragm 12 are arranged on the same side of the composite film 14. The spacer 15 may be annular. An annular spacer 15 is attached to the periphery of the composite film 14 around. The diaphragm 12 is connected to the middle of the composite film 14. The vibration assembly 11 is in contact with the magnetic assembly 16 through the annular spacer 15. A sound cavity 150 is formed between the diaphragm 12 and the magnetic force assembly 16. The diaphragm 12 vibrates in the sound cavity 150 to generate sound.

In one embodiment, the magnetic force assembly 16 includes a magnetic component 160 and a magnetic ring 163. The magnetic ring 163 is disposed around the outer side of the magnetic component 160. The magnetic ring 163 cooperates with the magnetic component 160 to form the magnetic gap 17.

In one embodiment, the magnetic ring 163 is rectangular. An accommodating cavity 165 is opened in the magnetic conducting ring 163. The magnetic component 160 has a rectangular parallelepiped shape. The magnetic component 160 is disposed in the accommodating cavity 165.

Further, the magnetic component 160 may be a regular hexagon. The length of the long side of the magnetic component 160 is less than the length of the long side of the magnetic ring 163. The opposite ends of the long side of the magnetic ring 163 are spaced apart from the opposite ends of the long side of the magnetic component 160 to form two symmetrical magnetic gaps 17.

In one embodiment, the magnetic component 160 includes a magnetic conductive block 162 and a magnetic member 161. One magnetic conductive block 162 is sandwiched between two magnetic members 161.

Further, the magnetic ring 163 and the magnetic conductive block 162 are made of metal. The metal material can be low carbon steel or iron. The two magnetic members 161 may be both permanent magnets or electromagnets, or one magnetic member 161 may be a permanent magnet and the other magnetic member 161 may be an electromagnet. One magnetic ring 163 is clamped by two magnetic pieces 161. The magnetic component 160 is arranged in the accommodating cavity 165 in the magnetic conducting ring 163. The magnetic member 161 is in close proximity to or in contact with the inner wall of the magnetic ring 163.

In this embodiment, the magnetic pole of the magnetized magnetic conductive block 162 near the end of the magnetic ring 163 may have a polarity of north. The magnetic pole of the magnetized magnetic ring 163 toward the end of the magnetic conductive block 162 may be a south pole. A magnetic field line exists in the magnetic gap 17 between the magnetic component 160 and the magnetic ring 163. The direction of the magnetic field lines 191 is vertically directed by the magnetic component 160 to the magnetic field lines 191 of the magnetic ring 163. When the semiconductor voice coil 13 is put into the magnetic gap 17, the magnetic induction line is perpendicular to the direction of the induction circuit 135, so that the semiconductor voice coil 13 vibrates up and down along the axis with a change of current, thereby driving the diaphragm 12 connected to the semiconductor voice coil 13 to vibrate and make sounds.

In one embodiment, the magnetic ring 163 includes a bump 164 disposed toward the magnetic component 160. The magnetic distance between the bump 164 and the magnetic component 160 is the area in the magnetic gap 17 where the distance is the smallest. The semiconductor voice coil 13 is disposed between the magnetic component 160 and the bump 164. The two semiconductor voice coils 13 are symmetrically arranged at the position where the magnetic spacing of the magnetic gap 17 is the smallest, so as to maximize the utilization of the magnetic circuit. The structure can ensure the balance of the vibration of the diaphragm 12 up and down, thereby reducing the distortion of the loudspeaker 1 and improving the sensitivity of the loudspeaker 1.

In one embodiment, the loudspeaker 1 further includes a connection seat 18, and the connection seat 18 is electrically connected to the semiconductor voice coil 13.

The connection seat 18 can be connected to the outer side of the magnetic ring 163 away from the magnetic component 160. A connection circuit (not shown) may be integrated in the connection seat 18. The connection circuit can be electrically connected to the semiconductor voice coil 13 through a conventional wire structure such as a circuit board or wires.

Figure 7:
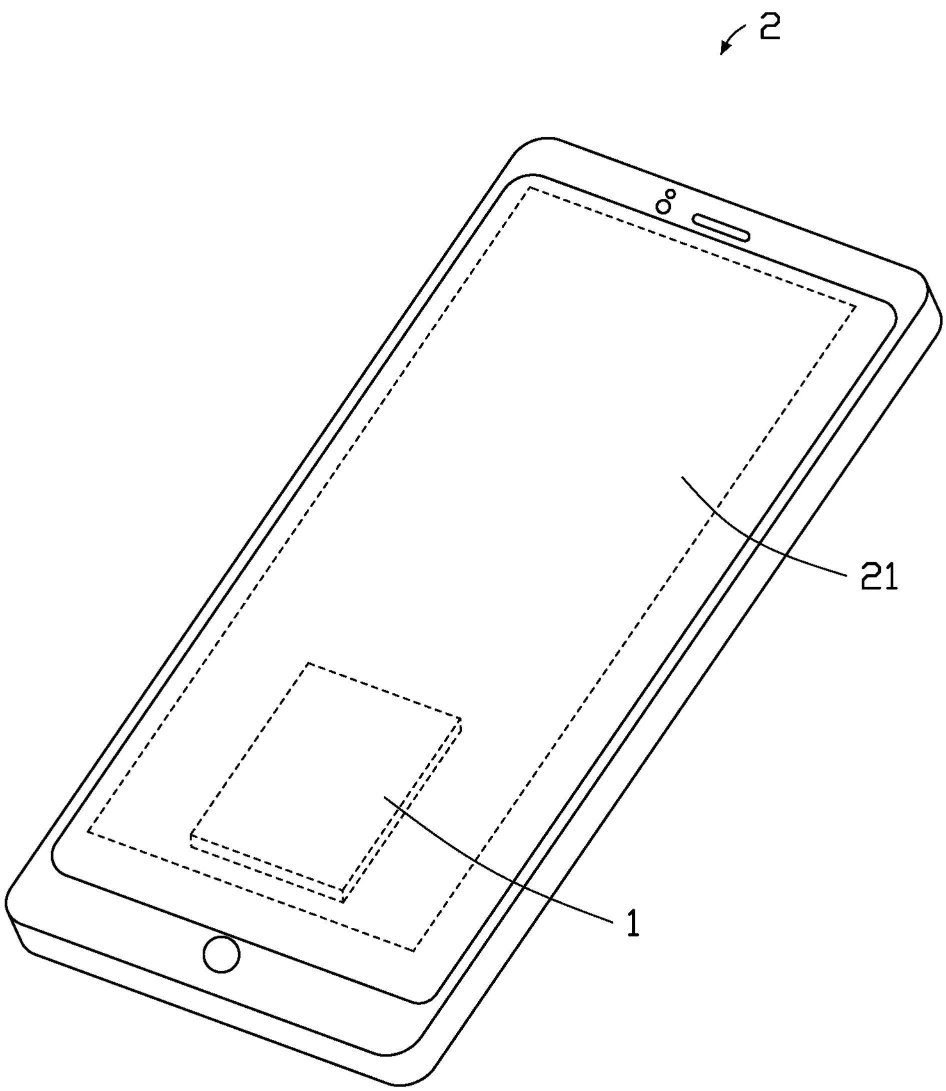
FIG. 7 is a schematic structural view of an electronic device.

As shown in FIG. 7, an embodiment of the present application further provides an electronic device 2. The electronic device 2 includes a circuit board 21 and a speaker 1, and the speaker 1 is electrically connected to the circuit board 21. In this exemplary embodiment, the electronic device is a mobile phone. In other embodiments, the electronic device can also be a notebook computer and other electrical appliances with a sound playback function, and the circuit board 21 can be a mainboard of a mobile phone.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A loudspeaker comprising a vibrating assembly and a magnetic force assembly, the magnetic force assembly and the vibrating assembly being arranged at intervals, wherein:

the vibrating component comprises a diaphragm and at least one semiconductor voice coil, and the semiconductor voice coil is arranged on a side of the diaphragm;

the magnetic force assembly and the semiconductor voice coil are arranged on the same side of the diaphragm, a magnetic gap is defined in the magnetic force assembly, the semiconductor voice coil is arranged in the magnetic gap, and the magnetic field lines in the magnetic gap are perpendicular to a flow direction of electric currents in the semiconductor voice coil;

the magnetic force assembly comprises a magnetic component and a magnetic ring, the magnetic ring is disposed around an outer side of the magnetic component, the magnetic gap is defined between the magnetic component and the magnetic ring;

the magnetic component comprises a magnetic conductive block and a magnetic member, and the magnetic conductive block is arranged between the two magnetic members.

2. The loudspeaker of claim 1, wherein a number of the semiconductor voice coils is two, the two semiconductor voice coils are arranged at intervals on the same side of the diaphragm, and two magnetic gaps are defined in the magnetic force assembly, the two magnetic gaps are arranged at intervals.

3. The loudspeaker of claim 2, wherein the two semiconductor voice coils are arranged in series.

4. The loudspeaker of claim 1, wherein each of the at least one semiconductor voice coil comprises a first end surface, and a first surface connected with the first end surface, the first surface is provided with an induction circuit, the first end face is connected with the diaphragm.

5. The loudspeaker of claim 1, wherein the magnetic ring is rectangular shaped, an accommodating cavity is defined in the magnetic ring, the magnetic component is a rectangular parallelepiped, and the magnetic component is arranged in the accommodating cavity.

6. The loudspeaker of claim 1, wherein the magnetic ring comprises a bump disposed toward the magnetic component, and a magnetic distance between the bump and the magnetic component is a minimum magnetic distance in the magnetic gap, the semiconductor voice coil is arranged between the magnetic component and the bump.

7. The loudspeaker of claim 1, further comprising a connection seat electrically connected with the semiconductor voice coil.

8. An electronic device comprising a circuit board and a loudspeaker, wherein the loudspeaker is electrically connected to the circuit board, the loudspeaker comprises a vibrating assembly and a magnetic force assembly, the magnetic force assembly and the vibrating assembly are arranged at intervals, wherein:

the vibrating component comprises a diaphragm and at least one semiconductor voice coil, and the semiconductor voice coil is arranged on a side of the diaphragm;

the magnetic force assembly and the semiconductor voice coil are arranged on the same side of the diaphragm, a magnetic gap is defined in the magnetic force assembly, the semiconductor voice coil is arranged in the magnetic gap, and the magnetic field lines in the magnetic gap are perpendicular to a flow direction of electric currents in the semiconductor voice coil;

the magnetic force assembly comprises a magnetic component and a magnetic ring, the magnetic ring is disposed around an outer side of the magnetic component, the magnetic gap is defined between the magnetic component and the magnetic ring;

the magnetic component comprises a magnetic conductive block and a magnetic member, and the magnetic conductive block is arranged between the two magnetic members.

9. The electronic device of claim 8, wherein a number of the semiconductor voice coils is two, the two semiconductor voice coils are arranged at intervals on the same side of the diaphragm, and two magnetic gaps are defined in the magnetic force assembly, the two magnetic gaps are arranged at intervals.

10. The electronic device of claim 9, wherein the two semiconductor voice coils are arranged in series.

11. The electronic device of claim 8, wherein each of the at least one semiconductor voice coil comprises a first end surface, and a first surface connected with the first end surface, the first surface is provided with an induction circuit, the first end face is connected with the diaphragm.

12. The electronic device of claim 8, wherein the magnetic ring is rectangular shaped, an accommodating cavity is defined in the magnetic ring, the magnetic component is a rectangular parallelepiped, and the magnetic component is arranged in the accommodating cavity.

13. The electronic device of claim 8, wherein the magnetic ring comprises a bump disposed toward the magnetic component, and a magnetic distance between the bump and the magnetic component is a minimum magnetic distance in the magnetic gap, the semiconductor voice coil is arranged between the magnetic component and the bump.

14. The electronic device of claim 8, further comprising a connection seat electrically connected with the semiconductor voice coil.

* * * * *